(12) United States Patent
Abhijeet et al.

(10) Patent No.: US 9,672,108 B2
(45) Date of Patent: Jun. 6, 2017

(54) DISPERSED STORAGE NETWORK (DSN) AND SYSTEM WITH IMPROVED SECURITY

(71) Applicant: International Business Machines Corporation, Armonk, NY (US)

(72) Inventors: Kumar Abhijeet, Chicago, IL (US); Greg R. Dhuse, Chicago, IL (US); S. Christopher Gladwin, Chicago, IL (US); Gary W. Grube, Barrington Hills, IL (US); Timothy W. Markison, Mesa, AZ (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/214,970

(22) Filed: Jul. 20, 2016

(65) Prior Publication Data

US 2016/0328296 A1    Nov. 10, 2016

Related U.S. Application Data

(63) Continuation-in-part of application No. 14/333,968, filed on Jul. 17, 2014, now Pat. No. 9,413,393, which
(Continued)

(51) Int. Cl.
*G06F 11/10* (2006.01)
*G06F 3/06* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
CPC combination set(s) only.
See application file for complete search history.

(56) References Cited

U.S. PATENT DOCUMENTS 4,092,732 A    5/1978  Ouchi
5,454,101 A    9/1995  Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Mulugeta Mengesha
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and to the memory, wherein the processing module, when operable within the computing device based on the operational instructions, is configured to perform various operations including to receive, via the interface, content retrieval messages for a data object. Then, based on the content retrieval messages for the data object and respectively for each associated data segment, the processing module determines respective groups of unique pillar combinations of at least read threshold number of EDSs, retrieves the respective groups of unique pillar combinations of at least read threshold number of EDSs from storage units (SUs) within the DSN, and provides the respective groups of unique pillar combinations of at least read threshold number of EDSs respectively to recipient device(s).

18 Claims, 8 Drawing Sheets

Related U.S. Application Data is a continuation-in-part of application No. 12/903,212, filed on Oct. 13, 2010, now Pat. No. 9,462,316.

(60) Provisional application No. 61/290,632, filed on Dec. 29, 2009.

(51) Int. Cl.

| | |
|---|---|
| *H04L 29/08* | (2006.01) |
| *G06F 21/10* | (2013.01) |
| *H03M 13/35* | (2006.01) |
| *H04L 9/08* | (2006.01) |
| *H04N 21/218* | (2011.01) |
| *H04N 21/231* | (2011.01) |
| *H04N 21/232* | (2011.01) |
| *H04L 29/06* | (2006.01) |

(52) U.S. Cl.
CPC ............ *G06F 3/0619* (2013.01); *G06F 21/10* (2013.01); *H03M 13/35* (2013.01); *H04L 9/085* (2013.01); *H04L 9/0894* (2013.01); *H04L 65/604* (2013.01); *H04L 65/607* (2013.01); *H04L 67/06* (2013.01); *H04L 67/1097* (2013.01); *H04N 21/2181* (2013.01); *H04N 21/232* (2013.01); *H04N 21/23116* (2013.01); *G06F 2221/0784* (2013.01); *G06F 2221/2107* (2013.01); *G06F 2221/2151* (2013.01); *H04L 63/102* (2013.01); *H04L 2209/60* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1* | 4/2007 | Gladwin ............ G06F 21/6227 711/154 |
| 2007/0088970 A1 | 4/2007 | Buxton et al. | |
| 2007/0174192 A1* | 7/2007 | Gladwin ............ G06F 21/6227 705/40 |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2009/0304360 A1* | 12/2009 | Morinaga ............... H04N 5/765 386/328 |
| 2010/0023524 A1* | 1/2010 | Gladwin ............... G06F 3/0617 707/E17.032 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 1511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

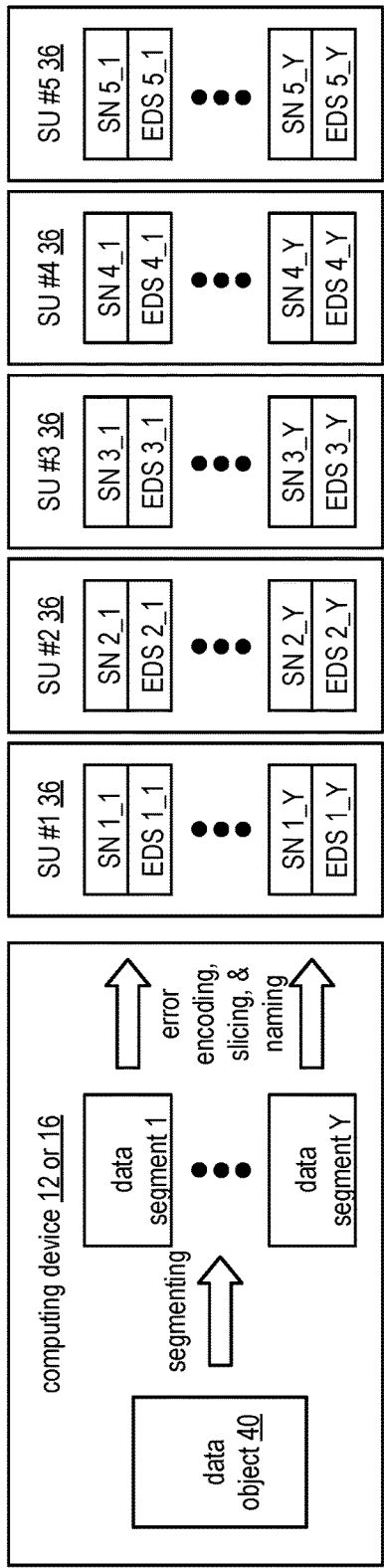
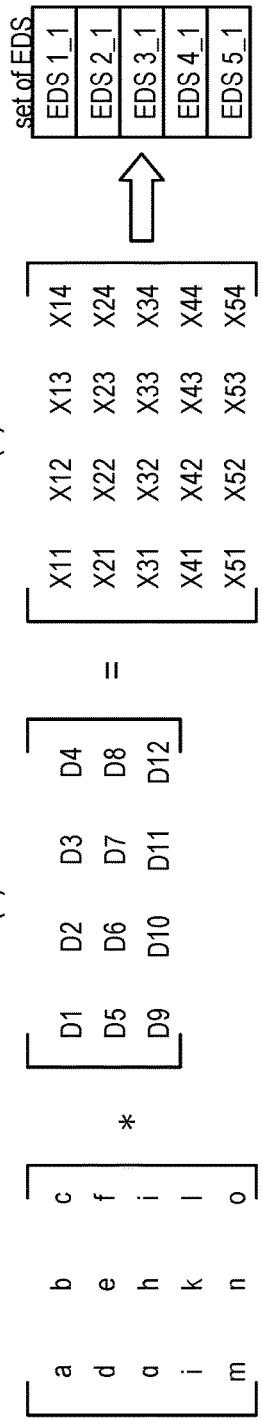
FIG. 3
FIG. 4
FIG. 5
FIG. 6

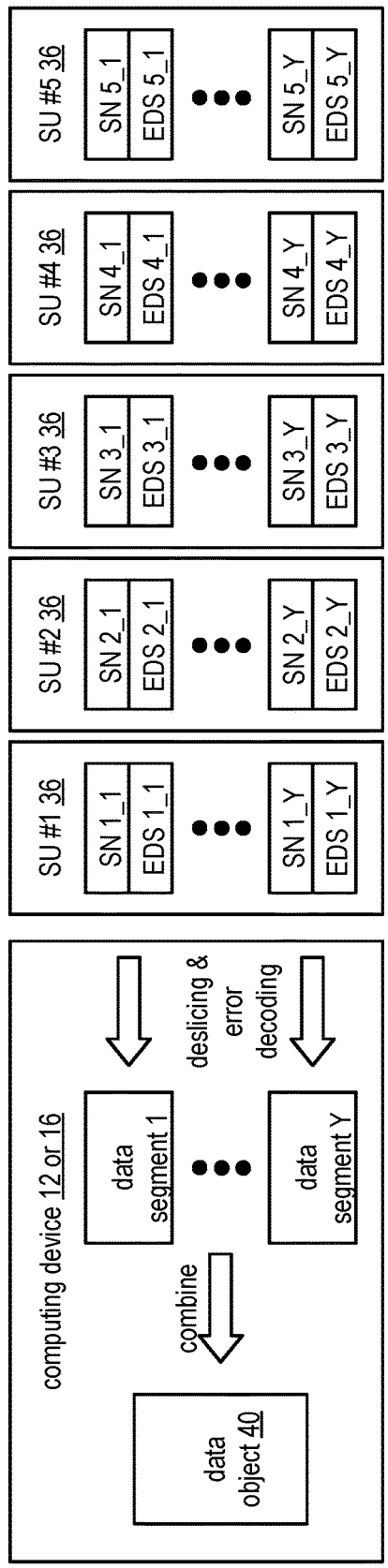

DISPERSED STORAGE NETWORK (DSN) AND SYSTEM WITH IMPROVED SECURITY

CROSS REFERENCE TO RELATED PATENTS

The present U.S. Utility patent application also claims priority pursuant to 35 U.S.C. §120, as a continuation-in-part (CIP), to the following U.S. Utility patent application which is hereby incorporated herein by reference in its entirety and made part of the present U.S. Utility patent application for all purposes, U.S. Utility patent application Ser. No. 14/333,968, entitled "ENCODING MULTI-MEDIA CONTENT FOR A CENTRALIZED DIGITAL VIDEO STORAGE SYSTEM," filed Jul. 17, 2014, pending, which claims priority pursuant to 35 U.S.C. §120, as a continuation-in-part (CIP), to the following U.S. Utility patent application which is hereby incorporated herein by reference in its entirety and made part of the present U.S. Utility patent application for all purposes, U.S. Utility patent application Ser. No. 12/903,212, entitled "DIGITAL CONTENT RETRIEVAL UTILIZING DISPERSED STORAGE," filed Oct. 13, 2010, pending, which claims priority pursuant to 35 U.S.C. §119(e) to U.S. Provisional Application No. 61/290,632, entitled "DIGITAL CONTENT DISTRIBUTED STORAGE," filed Dec. 29, 2009, expired, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within memory storage systems, there may be instances where more than one device (e.g., such as associated with more than one user) may request data. The prior art does not provide an adequate means by which various instantiations of that data may be provided to multiple devices (e.g., such as associated with multiple users) in an effective manner. In addition, in the content of media content providers, it can be very expensive if not totally impracticable to maintain multiple separate and distinct copies of the same media that is being requested by multiple devices (e.g., such as associated with multiple users). The prior art does not provide an adequate means by which data may be provided (sometimes concurrently, in parallel, and/or simultaneously) to multiple devices (e.g., such as associated with multiple users).

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

Figure 11:
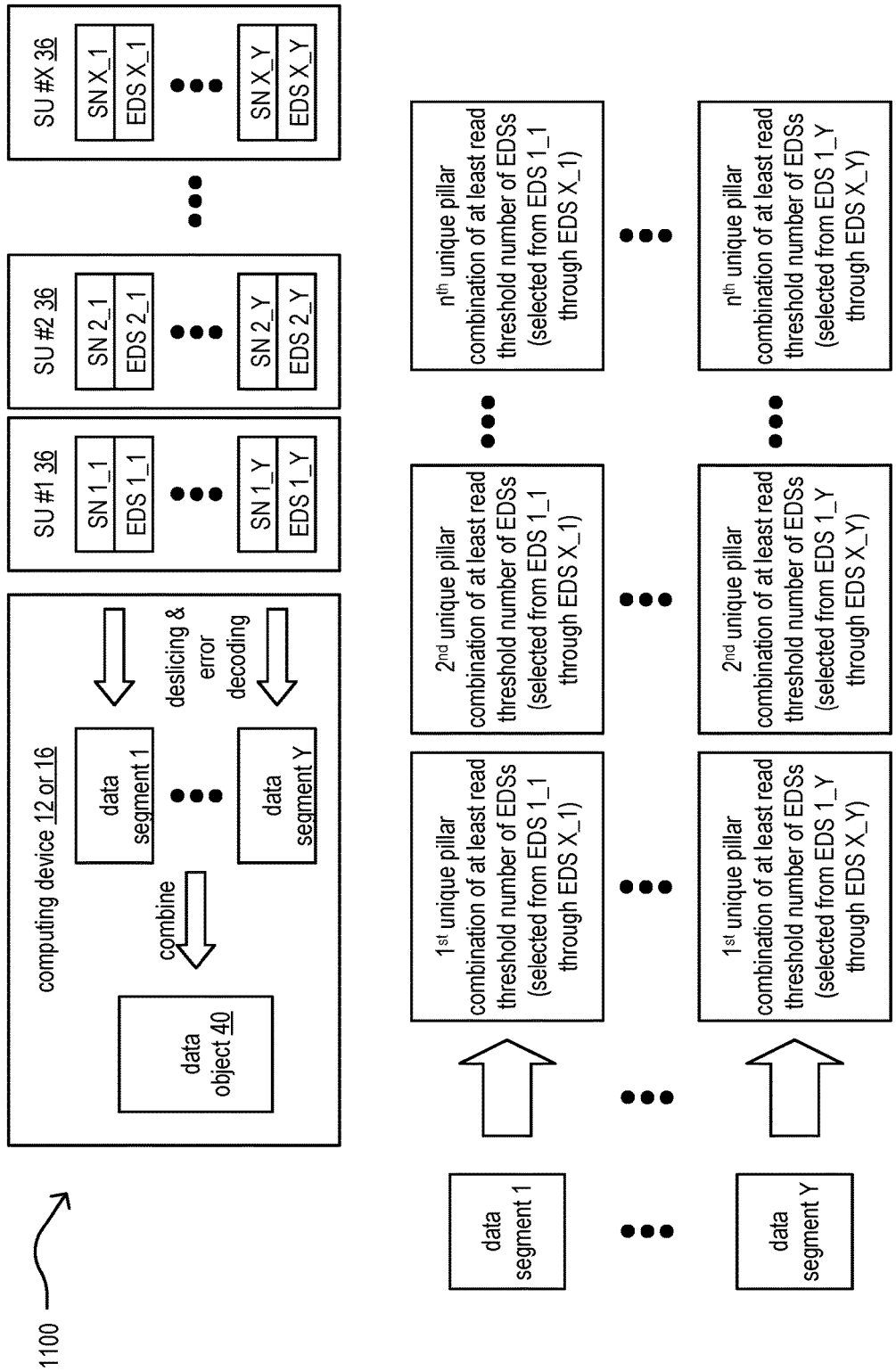
Figure 12:
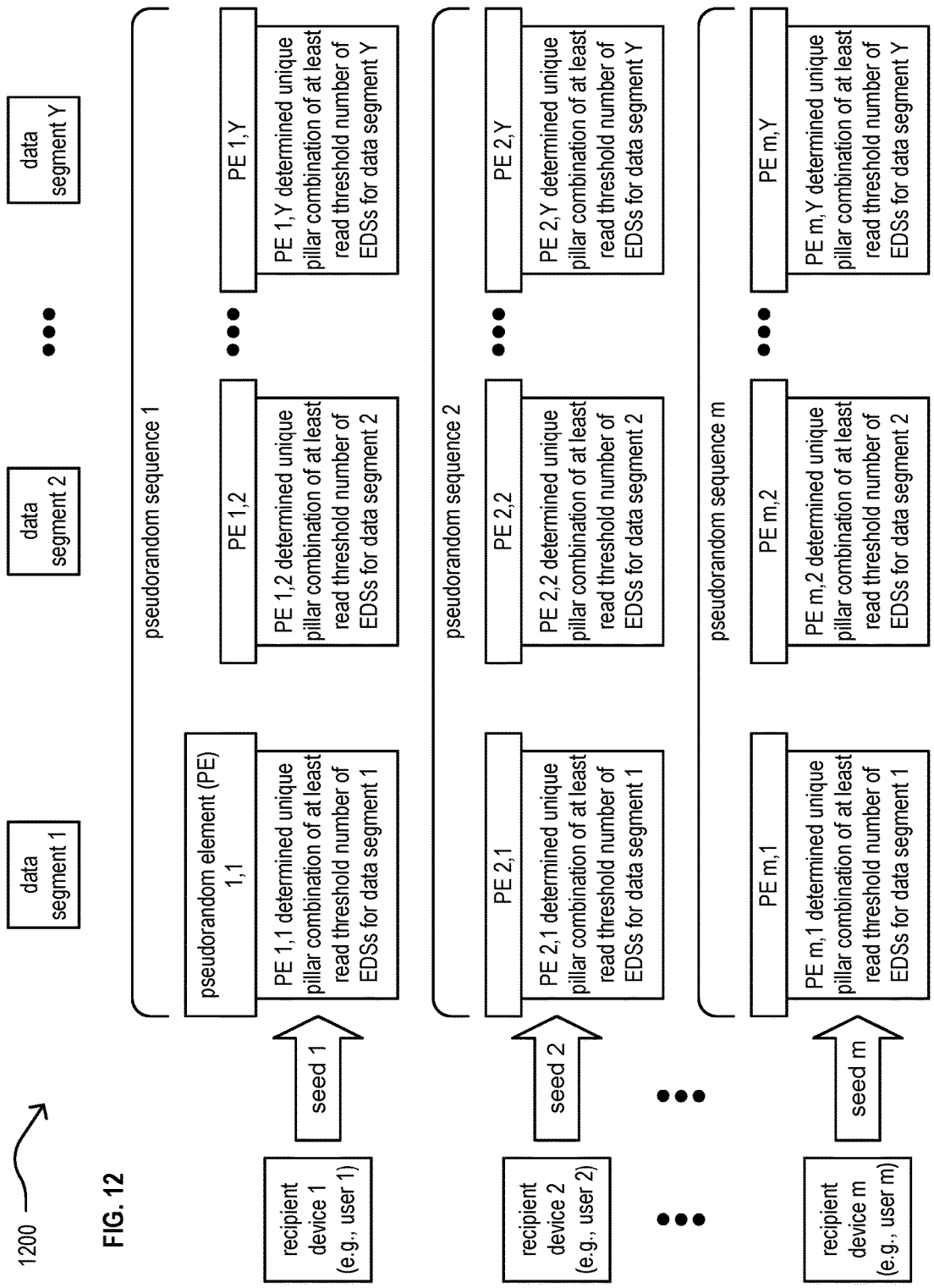

FIG. 11 is a schematic block diagram of an example of various unique pillar combinations of at least read threshold number of encoded data slices (EDSs) for various data segments in accordance with the present invention; and FIG. 12 is a schematic block diagram of an example of selecting different respective unique pillar combinations of at least read threshold number of EDSs for various data segments based on pseudorandom sequences in accordance with the present invention.

DETAILED DESCRIPTION OF THE INVENTION

Figure 1:
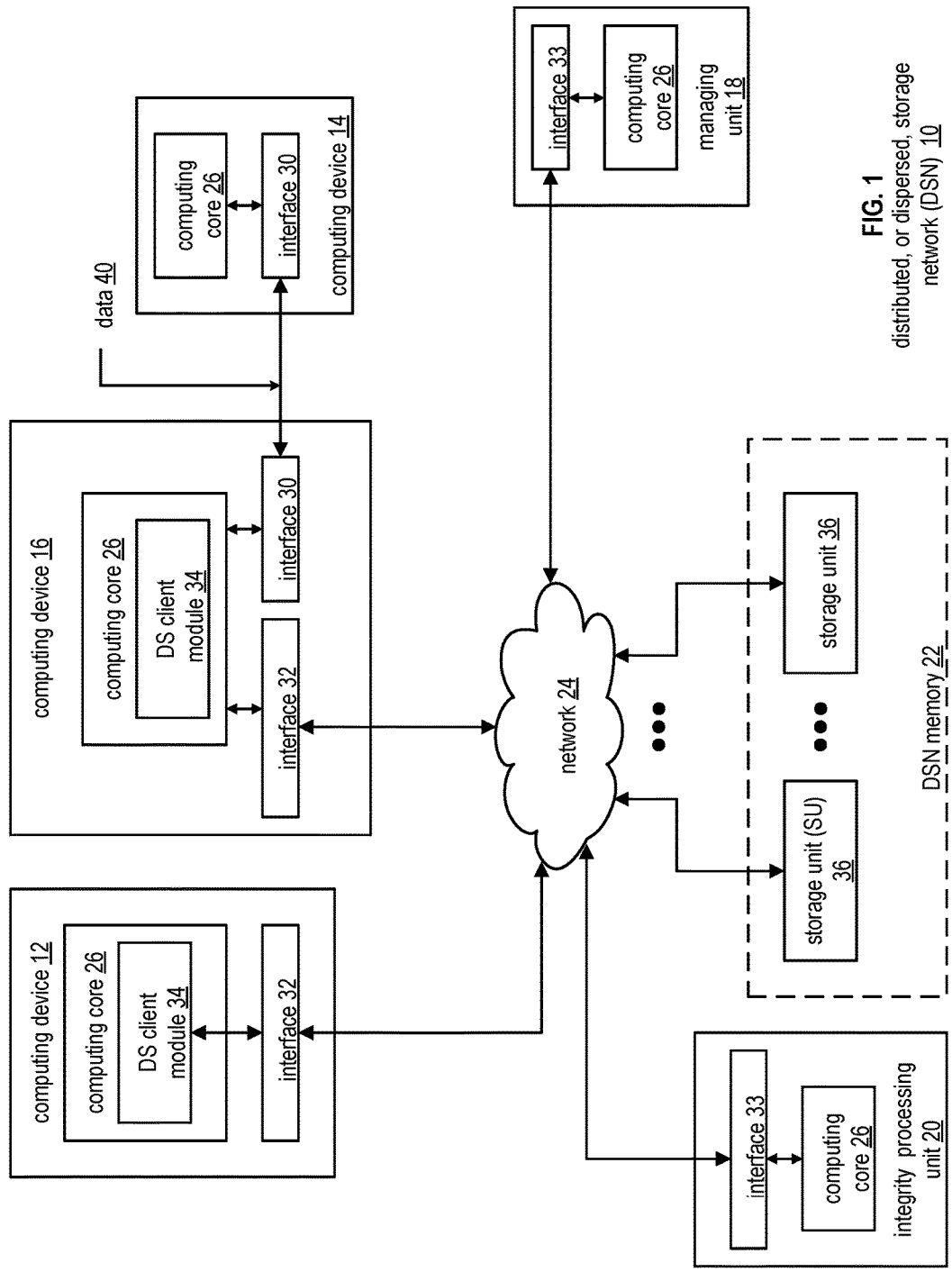
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
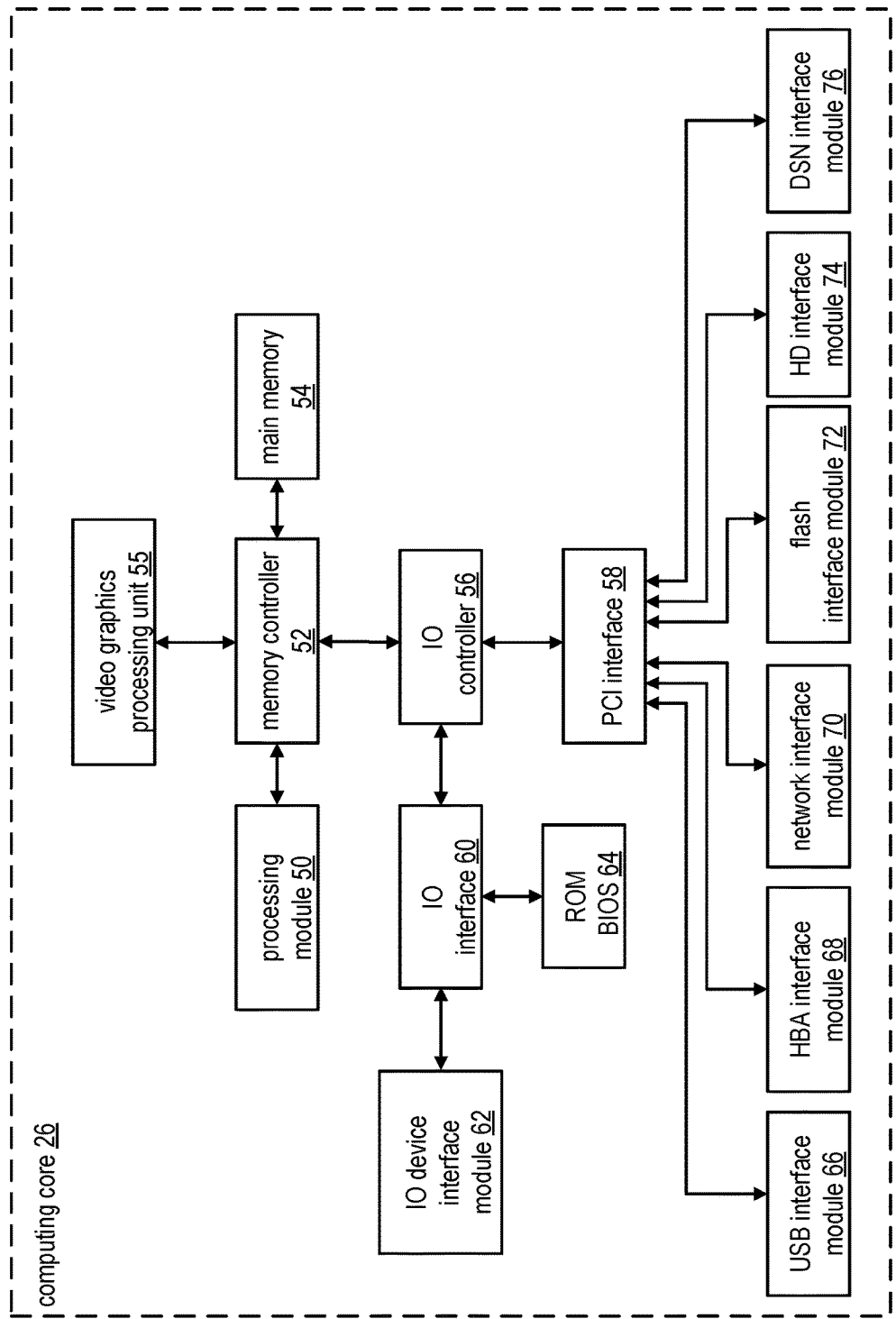
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Within various examples provided herein, a DSN processing unit, retrieval DSN processing unit, and/or other processing unit may be referenced. Such a DSN processing unit, retrieval DSN processing unit, and/or other processing unit may be implemented using one or more processing modules in one or more computing devices. In some examples, a single processing module in a single computing device is implemented to perform certain operations. In other examples, more than one processing module in a single computing device are implemented to perform certain operations. In even examples, more than one processing module in more than one computing device are implemented to perform certain operations. Various aspects of the invention may involve a computing device that includes an interface configured to interface and communicate with a dispersed storage network (DSN), a memory that stores operational instructions, and a processing module operably coupled to the interface and to the memory. The processing module, when operable within the computing device based on the operational instructions, is configured to perform various operations. Various other aspects of the invention may involve a method for execution by one or more computing devices of a dispersed storage network (DSN) regarding recording of broadcast multi-media content that is to be broadcast at a particular broadcast time.

Figure 9:
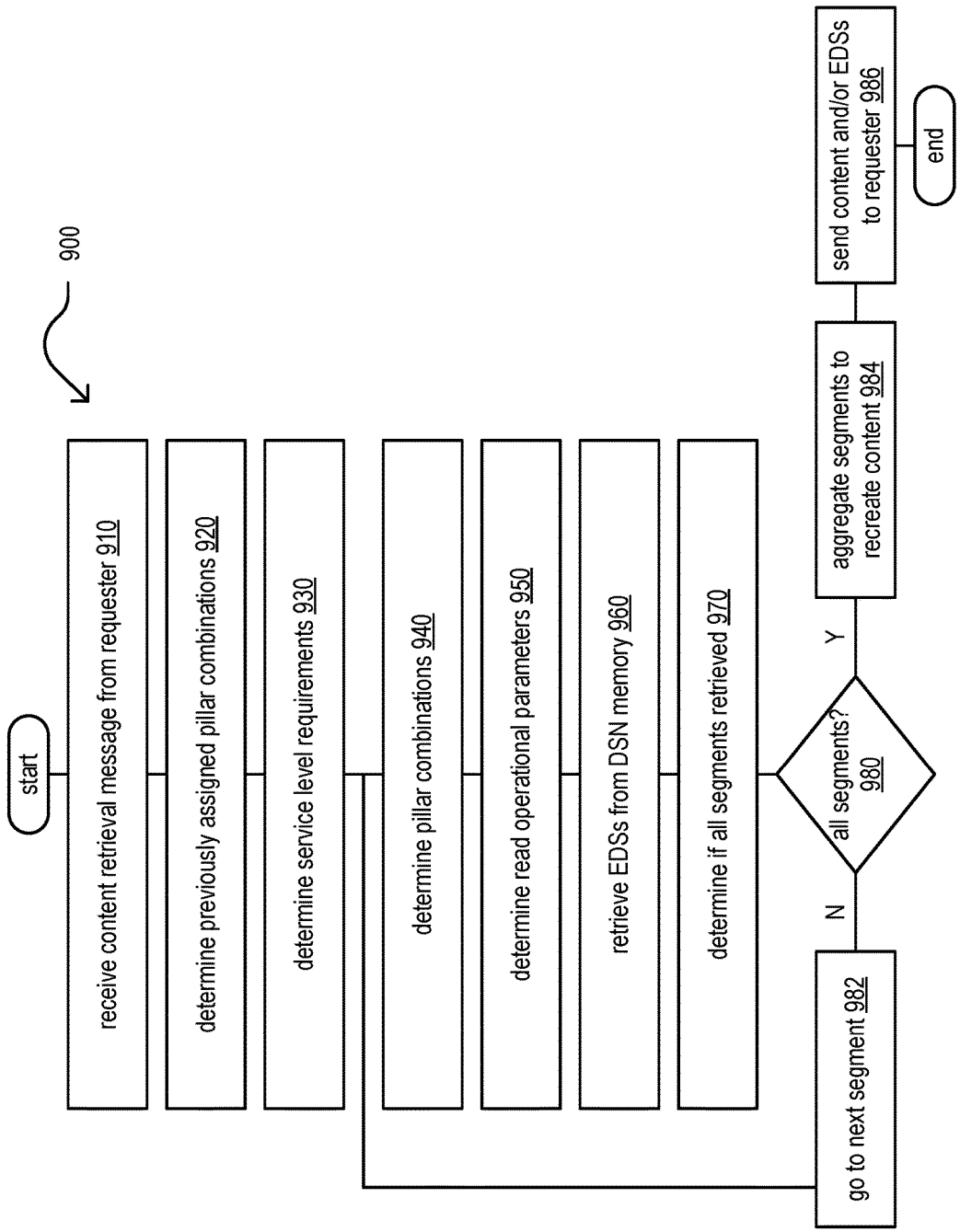
FIG. 9 is a diagram illustrating an embodiment of a method for execution by one or more computing devices in accordance with the present invention.

FIG. 9 is a diagram illustrating an embodiment of a method 900 for execution by one or more computing devices in accordance with the present invention. This diagram operates by performing operations by retrieving of content by a retrieval DSN processing unit when the retrieval DSN processing unit retrieves content that has restricted access. The method 900 begins with the step 910 where the retrieval DSN processing unit receives a content retrieval message from a requester. The requester may include a set top box, a user device, a storage integrity processing unit, a DSN managing unit, another DSN processing unit, and/or a DSN unit. The content retrieval message may include a content ID, a user ID, digital rights management (DRM) information, DRM policy, the read operational parameters, and/or a content type indicator.

Then, in step 920 of method 900, the retrieval DSN processing unit determines previously assigned pillar combinations where the pillar combinations include sets of DSN unit pillars that may be utilized to retrieve previously stored slices of the requested content. The determination may be based on one or more of but not limited to the content ID, the user ID, a vault lookup, a pillar combination table lookup, DRM information, DRM policy, the read operational parameters, system parameters, and/or a content type indicator.

Then, in step 930 of method 900, the retrieval DSN processing unit determines service-level requirements which may include cost requirements, availability requirements, reliability requirements, performance requirements, and/or combinations of requirements. For example, the user may require highly reliable retrievals where the cost is not important. In another example the user may require the lowest cost possible and is willing to sacrifice reliability. The determination may be based on one or more of but not limited to the content of the content retrieval message, content ID, the user ID, a vault lookup, a pillar combination table lookup, DRM information, DRM policy, the read operational parameters, system parameters, and/or a content type indicator.

Then, in step 940 of method 900, the retrieval DSN processing unit determines the pillar combinations for each data segment of the requested content which may include one or more unique sets of combination of pillars to retrieve slices from. The determination may be based on one or more of but not limited to the user ID, a vault lookup, a pillar combination table lookup, previously assigned pillars, previously utilized pillar combination by this user ID, a list of data segments and pillar combinations, a data segment ID, write operational parameters utilized when the content was stored in the DSN and memory, the content of the content retrieval message, content ID, DRM information, DRM policy, the read operational parameters, system parameters, and/or a content type indicator. In an embodiment, the retrieval DSN processing unit is assigning the read pillar combinations for the first time to this particular requester. In another embodiment the retrieval DSN processing unit is recalling the read pillar combinations for the second or greater time for this particular requester.

Note that there are many possible ways to allocate pillar combinations. For example, when the pillar width is 32 and the read threshold is 24 there are over 10 million ways to choose 24 pillars out of 32 pillars. In an instance, 10,000 users may be assigned an average of 1000 pillar combination each to provide a certain level of retrieval reliability. In some cases, a user may be assigned just five pillar combinations while in another case a user may be assigned 5000 pillar combinations based on one or more of but not limited to of service-level requirements, pillar combination availability, and/or service tiers and pricing levels. In an embodiment, each data segment utilizes a different set of pillar combinations to further improve the security if restricted access content.

Then, in step 950 of method 900, the retrieval DSN processing unit determines the read operational parameters which may include a pillar width, read threshold, write threshold, pillars allowed to retrieve from, the decode method, the de-sliced method, decryption method, and/or the decryption key. Note that the pillar combinations may be unique and specific to this requester if access to the content is restricted. The determination may be based on one or more of but not limited to the user ID, a vault lookup, a pillar combination table lookup, previously assigned pillars, write operational parameters utilized when the content was stored in the DSN and memory, the content of the content retrieval message, content ID, DRM information, DRM policy, the read operational parameters, system parameters, and/or a content type indicator.

Then, in step 960 of method 900, the retrieval DSN processing unit retrieves EC data slices (e.g., encoded data slices (EDSs)) for each data segment from the DSM memory in accordance with the read operational parameters, the allowed pillar combinations for the current data segment, and/or the DRM policy. In an embodiment, the retrieval DSN processing unit may de-slice and decode the slices to produce a data segment. The retrieval DSN processing unit may temporarily save each of the reproduced data segments until they are all retrieved. In another embodiment, the retrieval DSN processing unit may temporarily save each of the retrieved slices (e.g., at least a read threshold) for each of the data segments as they are retrieved until slices from all of the data segments are retrieved.

Then, in step 970 of method 900, the retrieval DSN processing unit determines if all of the data segments have been retrieved in step 980 based on one or more of but not limited to the read operational parameters, a content size indicator, and/or the data segments retrieved so far. The method 900 goes to the next segment in step 982 and branches back to the step where the retrieval DSN processing unit determines the pillar combinations (e.g., for the next data segment) when the retrieval DSN processing unit determines that all of the data segments have not been retrieved. Note that the retrieval DSN processing unit may utilize different read operational parameters and different pillar combinations for each data segment. The method continues to the next step when retrieval DSN processing unit determines that all of the data segments have been retrieved.

Then, if all of the data segments have been retrieved in step 980, the method 900 operates, in step 984, such that the retrieval DSN processing unit aggregates the save data segments to recreate the content portion. The retrieval DSN processing unit sends the content portion and/or the EC data slices (EDSs) of each data segment to the requester in response to the content retrieval message in step 986.

Figure 10:
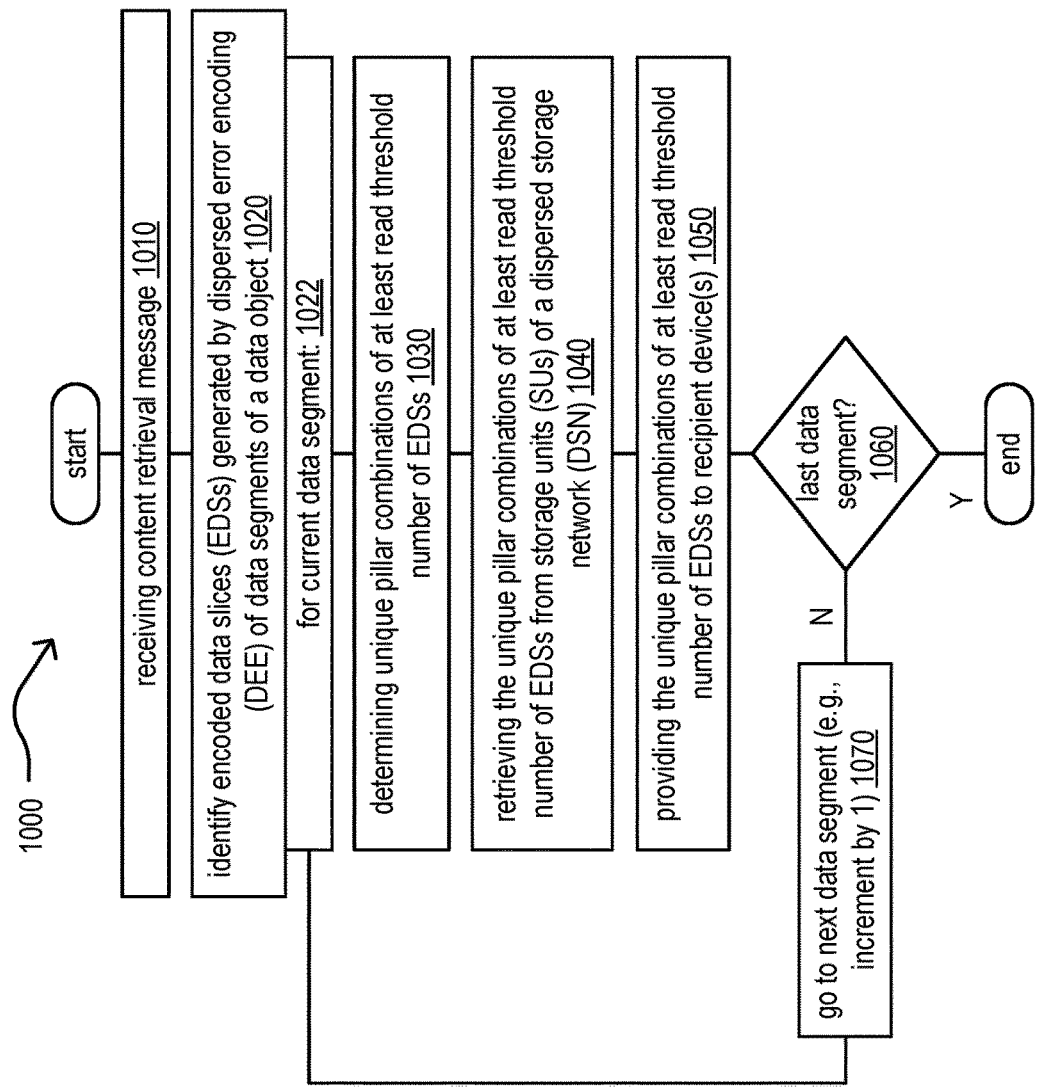
FIG. 10 is a diagram illustrating another embodiment of a method for execution by one or more computing devices in accordance with the present invention.

FIG. 10 is a diagram illustrating another embodiment of a method 1000 for execution by one or more computing devices in accordance with the present invention. The method 1000 may be viewed as a method for execution by one or more computing devices of a dispersed storage network (DSN) regarding recording of broadcast multimedia content that is to be broadcast at a particular broadcast time.

The method 1000 begins by receiving a plurality of content retrieval messages for a data object in step 1010. In some examples, the data object is segmented into a plurality of data segments, wherein a data segment of the plurality of data segments is dispersed error encoded (DEE) in accordance with dispersed error encoding parameters to produce a set of encoded data slices (EDSs) that is of pillar width. A read threshold number of EDSs provides for reconstruction of the data segment.

Then, based on the plurality of content retrieval messages for the data object and respectively for each data segment of the plurality of data segments, the method 1000 operates, for each data segment of the plurality of data segments associated with the data object by determining respective pluralities of unique pillar combinations of at least read threshold number of EDSs in step 1030. For example, consider operating on a current data segment in step 1022, then the method 1000 operates in step 1030 to determine different respective unique pillar combinations of at least read threshold number of EDSs for that current data segment.

For example, different respective unique pillar combinations of at least read threshold number of EDSs are determined in step 1030. For example, consider an example where the pillar width of EDSs for each data segment includes 16 EDSs and a read threshold number of 10 EDSs provides for reconstruction of the data segment. A first unique pillar combination of 10 read threshold number of the total of 16 EDSs may include EDS 1-10, a second unique pillar combinations of 10 read threshold number of the total of 16 EDSs may include EDS 2-11, a third unique pillar combinations of 10 read threshold number of the total of 16 EDSs may include EDS 2-12. Note that some examples may involve determining more than a read threshold number of EDSs to provide for reconstruction of the data segment (e.g., in a 16 EDSs system with 10 EDSs being the read threshold number of EDSs, providing unique pillar combinations of 12, which is the more than the minimum of 10 EDSs needed for reconstruction of the data segment so as to provide a bit more reliability, redundancy, etc.). In general, the operations of the step 1030 may employ any desired approach to make the determination of respective pluralities of unique pillar combinations of at least read threshold number of EDSs for a given data segment.

The method 1000 then operates in step 1040 by retrieving the respective pluralities of unique pillar combinations of at least read threshold number of EDSs from a plurality of storage units (SUs) within the DSN. These EDSs may be stored in memory across one or more storage units (SUs) of a dispersed storage network (DSN). The method 1000 operates by retrieving each of a necessary number of pluralities of unique pillar combinations of at least read threshold number of EDSs there from to service the current data segment based on the plurality of content retrieval messages for the data object.

The method 1000 then in step 1050 by providing the respective pluralities of unique pillar combinations of at least read threshold number of EDSs respectively to a plurality of recipient devices based on the plurality of content retrieval messages for the data object.

The method 1000 then in decision step 1060 to determine if all data segments have been services for the data object. If yes, then the method 1000 branches to end. Alternatively, if no, the method 1000 branches to go to the next data segment (e.g., increment the data segment by 1) in step 1070 and loops back to block 1022 to operate on this next data segment as the current data segment.

In some examples, for the current data segment, the method 1000 also operates by providing a first unique pillar combination of at least read threshold number of EDSs to a first recipient device (e.g., a requesting device such as a set to bot or any other types of device, a device associated with a user, etc.) based on a first content retrieval message of the plurality of content retrieval messages for the data object and also by providing a second unique pillar combination of at least read threshold number of EDSs to a second recipient device based on a second content retrieval message of the plurality of content retrieval messages for the data object.

In other examples, for a first data segment of the plurality of data segments, the method 1000 operates by providing a first unique pillar combination of at least read threshold number of EDSs corresponding to the first data segment of the plurality of data segments to a first recipient device based on a first content retrieval message of the plurality of content retrieval messages for the data object and also providing a second unique pillar combination of at least read threshold number of EDSs corresponding to the first data segment of the plurality of data segments to a second recipient device based on a second content retrieval message of the plurality of content retrieval messages for the data object. Then, for a second data segment of the plurality of data segments, the method 1000 operates by providing a first unique pillar combination of at least read threshold number of EDSs corresponding to the second data segment of the plurality of data segments to the first recipient device based on the first content retrieval message of the plurality of content retrieval messages for the data object and also providing a second unique pillar combination of at least read threshold number of EDSs corresponding to the second data segment of the plurality of data segments to the second recipient device based on the second content retrieval message of the plurality of content retrieval messages for the data object.

In even other examples, the method 1000 operates by determining a plurality of numbers or vectors for the plurality of content retrieval messages for the data object. Note that each number or vector is based on a different respective one of the plurality of content retrieval messages for the data object. The method 1000 then operates by generating respective pluralities of sequences for the plurality of content retrieval messages for the data object by applying the plurality of numbers or vectors to a pseudorandom sequence generator. Note that each sequence is based on a different respective one of the plurality of numbers or vectors being applied to the pseudorandom sequence generator.

Then, for a first data segment of the plurality of data segments, the method 1000 operates by determining a first unique pillar combination of at least read threshold number of EDSs corresponding to the first data segment of the plurality of data segments based on a first element of a first sequence of the respective pluralities of sequences and determining a second unique pillar combination of at least read threshold number of EDSs corresponding to the first data segment of the plurality of data segments based on a first element of a second sequence of the respective pluralities of sequences. Then, for a second data segment of the plurality of data segments, the method 1000 operates by determining a first unique pillar combination of at least read threshold number of EDSs corresponding to the second data segment of the plurality of data segments based on a second element of the first sequence of the respective pluralities of sequences and determining a second unique pillar combination of at least read threshold number of EDSs corresponding to the second data segment of the plurality of data segments based on a second element of the second sequence of the respective pluralities of sequences.

In some examples, note that a content retrieval message for a data object includes any one or more of a content identification code (ID), a user ID, digital rights management (DRM) information, DRM policy, read operational parameters utilized to retrieve EDSs of data segments of the data object from memory of the plurality of SUs within the DSN, and/or a content type indicator associated with the data object.

Also, in some examples, the operation of determining one of the respective pluralities of unique pillar combinations of at least read threshold number of EDSs is based on one or more of a user identification code (ID), a vault lookup, a pillar combination table lookup, a previously assigned unique pillar combination, a previously utilized pillar combination associated with the user ID, a list of data segments and pillar combinations, a data segment ID, write operational parameters utilized when the data object was stored in memory of the plurality of SUs within the DSN, content of a content retrieval message of the plurality of content retrieval messages for a data object, content ID, digital rights management (DRM) information, DRM policy, read operational parameters utilized to retrieve EDSs of data segments of the data object from memory of the plurality of SUs within the DSN, DSN system parameters, and/or a content type indicator associated with the data object.

Also, in other examples, a content retrieval message for the data object is associated with one or more of a set top box, a user device, a DSN managing unit, a storage integrity processing unit, a DSN processing unit, a DSN unit, a SU of the plurality of SUs within the DSN, a wireless smart phone, a laptop, a tablet, a personal computers (PC), a work station, and/or a video game device.

With respect to the various types of computing devices that may execute such a method as described herein, note that one or more computing devices may include any one or more of a Storage unit (SU) of the plurality of SUs within the DSN, a wireless smart phone, a laptop, a tablet, a personal computers (PC), a work station, and/or a video game device. Also, note that DSN may include any one or more of various types of communication networks, communication systems, etc. including a wireless communication system, a wire lined communication systems, a non-public intranet system, a public internet system, a local area network (LAN), and/or a wide area network (WAN).

FIG. 11 is a schematic block diagram of an example 1100 of various unique pillar combinations of at least read threshold number of encoded data slices (EDSs) for various data segments in accordance with the present invention. Consider the storage of EDSs generated for different respective data segments of a data object such as in accordance with FIG. 7 with a variant that the pillar width is X. Consider a read threshold number of EDSs being Z (e.g., less than X, and providing for reconstruction of a corresponding data segment.

For a given data segment (e.g., data segment 1), a desired number, n (where n is a positive integer greater than or equal to 1) of unique pillar combinations of at least read threshold number of EDSs may be identified (e.g., shown as $1^{st}$, $2^{nd}$ and up to $n^{th}$ unique pillar combination of at least read threshold number of EDSs (selected from EDS 1_1 through EDS X_1). A similar determination may be made with respect to each other data segment (e.g., data segment 2, and up to data segment Y). For example, for another given data segment (e.g., data segment Y), a desired number, n (where n is a positive integer greater than or equal to 1) of unique pillar combinations of at least read threshold number of EDSs may be identified (e.g., shown as $1^{st}$, $2^{nd}$ and up to $n^{th}$ unique pillar combination of at least read threshold number of EDSs (selected from EDS 1_Y through EDS X_Y). For each respective data segment, different unique pillar combination of at least read threshold number of EDSs may be provided to different respective recipient devices (e.g., associated with different respective users) using the various different, separate, and unique pillar combinations of at least read threshold number of EDSs. In some examples, note that different numbers of unique pillar combinations of at least read threshold number of EDSs may be determined for different data segments (e.g., up to $n^{th}$ unique pillar combination of at least read threshold number of EDSs for one data segment, up to $m^{th}$ unique pillar combination of at least read threshold number of EDSs for another data segment, and so on where n and m are different positive integers).

In general, any desired means may be used to determine the various unique pillar combinations of at least read threshold number of EDSs for each of the respective data segments. In some examples, each of the various unique pillar combinations of at least read threshold number of EDSs for a given data segment are different, separate, and distinct from one another.

FIG. 12 is a schematic block diagram of an example 1200 of selecting different respective unique pillar combinations of at least read threshold number of EDSs for various data segments based on pseudorandom sequences in accordance with the present invention. The differentiation between different unique pillar combinations of at least read threshold number of EDSs for a given data segment may be provided using a pseudorandom sequence generator (e.g., such as each being provided respectively to a corresponding different recipient device such as a recipient device 1 (e.g., associated with a user 1), a recipient device 2 (e.g., associated with a user 2), and so on up to a recipient device m (e.g., associated with a user m)).

For example, a pseudorandom sequence generator may be used to generate a sequence based on a starting or initial value that may be referred to as a seed (e.g., a seed being a number or vector) that is used to generate the sequence of numbers when applied to the pseudorandom sequence generator. For example, a seed may be viewed as being an integer that is used to set the starting point for generating a series of random numbers. The seed sets the pseudorandom sequence generator to a random starting point. A unique seed returns a unique random number sequence. Using different respective unique seeds will provide different respective series of random numbers (e.g., such as for the different recipient devices such as a recipient device 1 (e.g., associated with a user 1), a recipient device 2 (e.g., associated with a user 2), and so on up to a recipient device m (e.g., associated with a user m)).

Alternatively, note that a seed to be used in a pseudorandom number generator need not necessarily be random. For example, by choosing an appropriate seed to be used in a pseudorandom number generator, then as long as the original seed is ignored, the rest of the pseudorandom elements (PEs) in the unique random number sequence may be designed as to follow a probability distribution in a pseudorandom manner.

Note that the choice of a good random seed may be crucial when considering security. For example, when a secret encryption key is pseudorandomly generated, having the seed will allow a device to obtain the key. In such situations, high entropy may be important for selecting good random seed data. Note that if the same random seed may be deliberately shared (or unfortunately compromised, such as by a hacker), then the seed can be viewed as becoming a secret key. In such situations, two or more systems using matching pseudorandom number generators and matching seeds can generate matching sequences of non-repeating numbers or elements. Random seeds may be generated in various ways including based on a given state of the computer system (e.g., such as time), a cryptographically secure pseudorandom number generator or from a hardware random number generator.

Referring to the example 1200 of FIG. 12, consider a seed 1 applied to the pseudorandom number generator to generate a pseudorandom sequence 1 that includes pseudorandom element (PE) 1, 1 followed by PE 1, 2 and so on up to PE 1, Y. Each respective PE of the pseudorandom sequence 1 may be used to select a corresponding respective unique pillar combination of at least read threshold number of EDSs corresponding to a given data segment of the plurality of data segments. For example, PE 1,1 may be used to select one unique pillar combination of at least read threshold number of EDSs corresponding to data segment 1 such as for recipient device 1 (e.g., associated with a user 1). Similarly, PE 1,2 may be used to select one unique pillar combination of at least read threshold number of EDSs corresponding to data segment 2 such as for recipient device 1 (e.g., associated with a user 1) and so on until PE 1,Y may be used to select one unique pillar combination of at least read threshold number of EDSs corresponding to data segment Y such as for recipient device 1 (e.g., associated with a user 1).

This process may be performed similarly for each of the other recipient devices (e.g., associated with different respective users) as shown in the diagram. The mapping of a respective pseudorandom element of a given pseudorandom sequence to a respective unique pillar combination of at least read threshold number of EDSs corresponding to a given data segment may be made in any number of ways. For example, the different unique pillar combinations of at least read threshold number of EDSs corresponding to a given data segment may each be associated with a range, and then a specific PE of a pseudorandom sequence determines which unique pillar combination of at least read threshold number of EDSs corresponding to a given data segment is selected from among the different respective unique pillar combinations of at least read threshold number of EDSs corresponding to the given data segment.

For example, consider that a $1^{st}$ unique pillar combination of at least read threshold number of EDSs corresponding to a given data segment of range 0.000 to 0.100, a $2^{nd}$ unique pillar combination of at least read threshold number of EDSs corresponding to the given data segment of range 0.101 to 0.100, and so on for the various different unique pillar combinations of at least read threshold number of EDSs corresponding to the given data segment. If a PE 1,1 comes back as 0.050 based on the application of the pseudorandom number generator, then the $1^{st}$ unique pillar combination of at least read threshold number of EDSs corresponding to the given data segment is selected based on the PE 1,1 for the data segment 1 for a recipient device 1 (e.g., associated with a user 1). Alternatively, if a PE 1,1 comes back as 0.176 based on the application of the pseudorandom number generator, then the $2^{nd}$ unique pillar combination of at least read threshold number of EDSs corresponding to the given data segment is selected based on the PE 1,1 for the data segment 1 for the recipient device 1 (e.g., associated with the user 1). Alternatively, other means may be performed to effectuate the mapping from a PE to select a particular unique pillar combination of at least read threshold number of EDSs corresponding to the given data segment from among the various different unique pillar combinations of at least read threshold number of EDSs corresponding to the given data segment (e.g., a deterministic function, comparison of the PE to one or more thresholds, etc.).

As can be seen, from segment to segment, randomization may be used to provide different respective for the various different unique pillar combinations of at least read threshold number of EDSs corresponding to the given data segments to different recipient devices such as a recipient device 1 (e.g., associated with a user 1), a recipient device 2 (e.g., associated with a user 2), and so on up to a recipient device m (e.g., associated with a user m).

Also, in some examples, note that different length and type of pseudorandom sequences may be used as may be desirable, suitable, or applicable for different applications. For example, one length and type of pseudorandom sequence may be used to select the unique pillar combinations of at least read threshold number of EDSs for the respective segments of one data object, and another length and type of pseudorandom sequence may be used to select the unique pillar combinations of at least read threshold number of EDSs for the respective segments of another data object, and so on. In even other examples, different length and type of pseudorandom sequences may be used for different respective recipient devices, users, etc. at the same or different times.

In an example of operation and implementation, a computing device includes an interface configured to interface and communicate with a dispersed storage network (DSN), a memory that stores operational instructions, and a processing module operably coupled to the interface and to the memory, wherein the processing module, when operable within the computing device based on the operational instructions, is configured to perform various operations.

For example, the processing module, when operable within the computing device based on the operational instructions, determines a plurality of numbers or vectors for the plurality of content retrieval messages for the data object, wherein each number or vector is based on a different respective one of the plurality of content retrieval messages for the data object. Them, the processing module generates respective pluralities of sequences for the plurality of content retrieval messages for the data object by applying the plurality of numbers or vectors to a pseudorandom sequence generator. Each sequence is based on a different respective one of the plurality of numbers or vectors (e.g., seeds) being applied to the pseudorandom sequence generator. For a first data segment of the plurality of data segments, the processing module determines a first unique pillar combination of at least read threshold number of EDSs corresponding to the first data segment of the plurality of data segments based on a first element of a first sequence of the respective pluralities of sequences and also determines a second unique pillar combination of at least read threshold number of EDSs corresponding to the first data segment of the plurality of data segments based on a first element of a second sequence of the respective pluralities of sequences.

For a second data segment of the plurality of data segments, the processing module determines a first unique pillar combination of at least read threshold number of EDSs corresponding to the second data segment of the plurality of data segments based on a second element of the first sequence of the respective pluralities of sequences and determines a second unique pillar combination of at least read threshold number of EDSs corresponding to the second data segment of the plurality of data segments based on a second element of the second sequence of the respective pluralities of sequences.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more computing devices of a dispersed storage network (DSN) regarding recording of broadcast multi-media content that is to be broadcast at a particular broadcast time, the method comprising:

receiving a plurality of content retrieval messages for a data object, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein a read threshold number of EDSs provides for reconstruction of the data segment;

based on the plurality of content retrieval messages for the data object and respectively for each data segment of the plurality of data segments:
    determining respective pluralities of unique pillar combinations of at least read threshold number of EDSs;
    retrieving the respective pluralities of unique pillar combinations of at least read threshold number of EDSs from a plurality of storage units (SUs) within the DSN; and
    providing the respective pluralities of unique pillar combinations of at least read threshold number of EDSs respectively to a plurality of recipient devices based on the plurality of content retrieval messages for the data object.

2. The method of claim 1 further comprising, for the data segment of the plurality of data segments:

providing a first unique pillar combination of at least read threshold number of EDSs to a first recipient device based on a first content retrieval message of the plurality of content retrieval messages for the data object; and providing a second unique pillar combination of at least read threshold number of EDSs to a second recipient device based on a second content retrieval message of the plurality of content retrieval messages for the data object.

3. The method of claim 1 further comprising:

for a first data segment of the plurality of data segments:
    providing a first unique pillar combination of at least read threshold number of EDSs corresponding to the first data segment of the plurality of data segments to a first recipient device based on a first content retrieval message of the plurality of content retrieval messages for the data object; and
    providing a second unique pillar combination of at least read threshold number of EDSs corresponding to the first data segment of the plurality of data segments to a second recipient device based on a second content retrieval message of the plurality of content retrieval messages for the data object; and for a second data segment of the plurality of data segments:

providing a first unique pillar combination of at least read threshold number of EDSs corresponding to the second data segment of the plurality of data segments to the first recipient device based on the first content retrieval message of the plurality of content retrieval messages for the data object; and providing a second unique pillar combination of at least read threshold number of EDSs corresponding to the second data segment of the plurality of data segments to the second recipient device based on the second content retrieval message of the plurality of content retrieval messages for the data object.

4. The method of claim 1 further comprising:

determining a plurality of numbers or vectors for the plurality of content retrieval messages for the data object, wherein each number or vector is based on a different respective one of the plurality of content retrieval messages for the data object;

generating respective pluralities of sequences for the plurality of content retrieval messages for the data object by applying the plurality of numbers or vectors to a pseudorandom sequence generator, wherein each sequence is based on a different respective one of the plurality of numbers or vectors being applied to the pseudorandom sequence generator;

for a first data segment of the plurality of data segments:

determining a first unique pillar combination of at least read threshold number of EDSs corresponding to the first data segment of the plurality of data segments based on a first element of a first sequence of the respective pluralities of sequences; and determining a second unique pillar combination of at least read threshold number of EDSs corresponding to the first data segment of the plurality of data segments based on a first element of a second sequence of the respective pluralities of sequences; and for a second data segment of the plurality of data segments:

determining a first unique pillar combination of at least read threshold number of EDSs corresponding to the second data segment of the plurality of data segments based on a second element of the first sequence of the respective pluralities of sequences; and determining a second unique pillar combination of at least read threshold number of EDSs corresponding to the second data segment of the plurality of data segments based on a second element of the second sequence of the respective pluralities of sequences.

5. The method of claim 1, wherein a content retrieval message of the plurality of content retrieval messages for a data object includes at least one of:

a content identification code (ID), a user ID, digital rights management (DRM) information, DRM policy, read operational parameters utilized to retrieve EDSs of data segments of the data object from memory of the plurality of SUs within the DSN, or a content type indicator associated with the data object.

6. The method of claim 1, wherein determining one of the respective pluralities of unique pillar combinations of at least read threshold number of EDSs is based on at least one of:

a user identification code (ID), a vault lookup, a pillar combination table lookup, a previously assigned unique pillar combination, a previously utilized pillar combination associated with the user ID, a list of data segments and pillar combinations, a data segment ID, write operational parameters utilized when the data object was stored in memory of the plurality of SUs within the DSN, content of a content retrieval message of the plurality of content retrieval messages for a data object, content ID, digital rights management (DRM) information, DRM policy, read operational parameters utilized to retrieve EDSs of data segments of the data object from memory of the plurality of SUs within the DSN, DSN system parameters, or a content type indicator associated with the data object.

7. The method of claim 1, wherein a content retrieval message of the plurality of content retrieval messages for the data object is associated with at least one of a set top box, a user device, a DSN managing unit, a storage integrity processing unit, a DSN processing unit, a DSN unit, a SU of the plurality of SUs within the DSN, a wireless smart phone, a laptop, a tablet, a personal computers (PC), a work station, or a video game device.

8. The method of claim 1, wherein the one or more computing devices includes a SU of the plurality of SUs within the DSN, a wireless smart phone, a laptop, a tablet, a personal computers (PC), a work station, or a video game device.

9. The method of claim 1, wherein the DSN includes at least one of a wireless communication system, a wire lined communication systems, a non-public intranet system, a public internet system, a local area network (LAN), or a wide area network (WAN).

10. A computing device comprising:

an interface configured to interface and communicate with a dispersed storage network (DSN);

memory that stores operational instructions; and a processing module operably coupled to the interface and to the memory, wherein the processing module, when operable within the computing device based on the operational instructions, is configured to:

receive, via the interface, a plurality of content retrieval messages for a data object, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein a read threshold number of EDSs provides for reconstruction of the data segment;

based on the plurality of content retrieval messages for the data object and respectively for each data segment of the plurality of data segments:

determine respective pluralities of unique pillar combinations of at least read threshold number of EDSs;

retrieve the respective pluralities of unique pillar combinations of at least read threshold number of EDSs from a plurality of storage units (SUs) within the DSN; and provide the respective pluralities of unique pillar combinations of at least read threshold number of EDSs respectively to a plurality of recipient devices based on the plurality of content retrieval messages for the data object.

11. The computing device of claim 10, wherein the processing module, when operable within the computing device based on the operational instructions, is further configured, for the data segment of the plurality of data segments, to:
provide a first unique pillar combination of at least read threshold number of EDSs to a first recipient device based on a first content retrieval message of the plurality of content retrieval messages for the data object; and
provide a second unique pillar combination of at least read threshold number of EDSs to a second recipient device based on a second content retrieval message of the plurality of content retrieval messages for the data object.

12. The computing device of claim 10, wherein the processing module, when operable within the computing device based on the operational instructions, is further configured to:
for a first data segment of the plurality of data segments:
provide a first unique pillar combination of at least read threshold number of EDSs corresponding to the first data segment of the plurality of data segments to a first recipient device based on a first content retrieval message of the plurality of content retrieval messages for the data object; and
provide a second unique pillar combination of at least read threshold number of EDSs corresponding to the first data segment of the plurality of data segments to a second recipient device based on a second content retrieval message of the plurality of content retrieval messages for the data object; and
for a second data segment of the plurality of data segments:
provide a first unique pillar combination of at least read threshold number of EDSs corresponding to the second data segment of the plurality of data segments to the first recipient device based on the first content retrieval message of the plurality of content retrieval messages for the data object; and
provide a second unique pillar combination of at least read threshold number of EDSs corresponding to the second data segment of the plurality of data segments to the second recipient device based on the second content retrieval message of the plurality of content retrieval messages for the data object.

13. The computing device of claim 10, wherein the processing module, when operable within the computing device based on the operational instructions, is further configured to:
determine a plurality of numbers or vectors for the plurality of content retrieval messages for the data object, wherein each number or vector is based on a different respective one of the plurality of content retrieval messages for the data object;
generate respective pluralities of sequences for the plurality of content retrieval messages for the data object by applying the plurality of numbers or vectors to a pseudorandom sequence generator, wherein each sequence is based on a different respective one of the plurality of numbers or vectors being applied to the pseudorandom sequence generator;
for a first data segment of the plurality of data segments:
determine a first unique pillar combination of at least read threshold number of EDSs corresponding to the first data segment of the plurality of data segments based on a first element of a first sequence of the respective pluralities of sequences; and
determine a second unique pillar combination of at least read threshold number of EDSs corresponding to the first data segment of the plurality of data segments based on a first element of a second sequence of the respective pluralities of sequences; and
for a second data segment of the plurality of data segments:
determine a first unique pillar combination of at least read threshold number of EDSs corresponding to the second data segment of the plurality of data segments based on a second element of the first sequence of the respective pluralities of sequences; and
determine a second unique pillar combination of at least read threshold number of EDSs corresponding to the second data segment of the plurality of data segments based on a second element of the second sequence of the respective pluralities of sequences.

14. The computing device of claim 10, wherein a content retrieval message of the plurality of content retrieval messages for a data object includes at least one of:
a content identification code (ID), a user ID, digital rights management (DRM) information, DRM policy, read operational parameters utilized to retrieve EDSs of data segments of the data object from memory of the plurality of SUs within the DSN, or a content type indicator associated with the data object.

15. The computing device of claim 10, wherein the processing module, when operable within the computing device based on the operational instructions, determining one of the respective pluralities of unique pillar combinations of at least read threshold number of EDSs is based on at least one of:
a user identification code (ID), a vault lookup, a pillar combination table lookup, a previously assigned unique pillar combination, a previously utilized pillar combination associated with the user ID, a list of data segments and pillar combinations, a data segment ID, write operational parameters utilized when the data object was stored in memory of the plurality of SUs within the DSN, content of a content retrieval message of the plurality of content retrieval messages for a data object, content ID, digital rights management (DRM) information, DRM policy, read operational parameters utilized to retrieve EDSs of data segments of the data object from memory of the plurality of SUs within the DSN, DSN system parameters, or a content type indicator associated with the data object.

16. The computing device of claim 10, wherein a content retrieval message of the plurality of content retrieval messages for the data object is associated with at least one of a set top box, a user device, a DSN managing unit, a storage integrity processing unit, a DSN processing unit, a DSN unit, a SU of the plurality of SUs within the DSN, a wireless smart phone, a laptop, a tablet, a personal computers (PC), a work station, or a video game device.

17. The computing device of claim 10 further comprising:
a SU of the plurality of SUs within the DSN, a wireless smart phone, a laptop, a tablet, a personal computers (PC), a work station, or a video game device.

18. The computing device of claim 10, wherein the DSN includes at least one of a wireless communication system, a wire lined communication systems, a non-public intranet system, a public internet system, a local area network (LAN), or a wide area network (WAN).

* * * * *